(12) United States Patent
Odell et al.

(10) Patent No.: US 11,418,121 B2
(45) Date of Patent: Aug. 16, 2022

(54) AUXILIARY CONVERTER TO PROVIDE OPERATING POWER FOR A CONTROLLER

(71) Applicant: Power Integrations, Inc., San Jose, CA (US)

(72) Inventors: Arthur B. Odell, Morgan Hill, CA (US); Munadir Aziz Ahmed, San Mateo, CA (US)

(73) Assignee: Power Integrations, Inc, San Jose, CA (US)

( * ) Notice: Subject to any disclaimer, the term of this patent is extended or adjusted under 35 U.S.C. 154(b) by 58 days.

(21) Appl. No.: 16/792,132

(22) Filed: Feb. 14, 2020

(65) Prior Publication Data

US 2021/0203235 A1 Jul. 1, 2021

Related U.S. Application Data

(60) Provisional application No. 62/954,807, filed on Dec. 30, 2019.

(51) Int. Cl.
*H02M 3/335* (2006.01)
*H02M 3/155* (2006.01)

(52) U.S. Cl.
CPC ....... *H02M 3/33507* (2013.01); *H02M 3/155* (2013.01); *H02M 3/33561* (2013.01)

(58) Field of Classification Search
None
See application file for complete search history.

(56) References Cited

U.S. PATENT DOCUMENTS

| 5,285,369 A | 2/1994 | Balakrishnan |
| 5,313,381 A | 5/1994 | Balakrishnan |

(Continued)

FOREIGN PATENT DOCUMENTS

| CN | 113131744 A | 7/2021 |
| WO | 2017095408 A1 | 6/2017 |
| WO | 2020242440 A1 | 12/2020 |

OTHER PUBLICATIONS

Song, et al., "Comparison between Control Methods of Active Clamp Flyback for Adaptor Application," 2018 IEEE International Power Electronics and Application Conference and Exposition (PEAC), Shenzhen, China, 2018, pp. 1-6, 2018.

(Continued)

*Primary Examiner* — Jeffrey A Gblende
(74) *Attorney, Agent, or Firm* — Power Integrations, Inc.

(57) ABSTRACT

An auxiliary converter coupled to an output of a main power converter comprising an auxiliary switch, a timing circuit, and an energy transfer element. The auxiliary switch coupled to the output of the main power converter. A timing circuit coupled to receive a control signal from a controller of the main power converter, wherein the controller regulates the output of the main power converter, the timing circuit configured to output an auxiliary drive signal to control switching of the auxiliary switch in response to the control signal. The energy transfer element coupled to the auxiliary switch, wherein the energy transfer element is configured to transfer energy from the output of the main power converter to a supply of the controller, the supply provides operational power for the controller of the main power converter.

46 Claims, 9 Drawing Sheets

(56) References Cited

U.S. PATENT DOCUMENTS

| | | | |
|---|---|---|---|
| 5,424,932 A * | 6/1995 | Inou | H02M 3/33561 363/127 |
| 6,462,971 B1 | 10/2002 | Balakrishnan et al. | |
| 6,525,514 B1 | 2/2003 | Balakrishnan et al. | |
| 6,775,155 B2 | 8/2004 | Park | |
| 7,157,813 B2 | 1/2007 | Djenguerian et al. | |
| 7,425,834 B2 | 9/2008 | Matthews et al. | |
| 7,576,528 B2 | 8/2009 | Wang et al. | |
| 7,952,895 B2 | 5/2011 | Matthews et al. | |
| 7,995,359 B2 | 8/2011 | Djenguerian et al. | |
| 8,063,622 B2 | 11/2011 | Kung et al. | |
| 8,077,483 B2 | 12/2011 | Djenguerian et al. | |
| 8,225,111 B2 | 7/2012 | Bailey et al. | |
| 8,243,477 B2 | 8/2012 | Polivka et al. | |
| 8,385,088 B2 | 2/2013 | Bailey et al. | |
| 9,019,728 B2 | 4/2015 | Matthews et al. | |
| 9,036,369 B2 | 5/2015 | Mayell et al. | |
| 9,178,411 B2 | 11/2015 | Djenguerian et al. | |
| 9,331,587 B2 | 5/2016 | Djenguerian et al. | |
| 9,479,065 B2 | 10/2016 | Mao et al. | |
| 9,667,154 B2 | 5/2017 | Colbeck | |
| 9,866,122 B2 | 1/2018 | Werner et al. | |
| 10,033,284 B2 | 7/2018 | Werner et al. | |
| 10,186,976 B2 * | 1/2019 | Duvnjak | H02M 3/33592 |
| 10,291,136 B2 | 5/2019 | Song et al. | |
| 10,326,306 B2 | 6/2019 | Peter et al. | |
| 2003/0076078 A1 | 4/2003 | Balakrishnan et al. | |
| 2003/0090253 A1 | 5/2003 | Balakrishnan | |
| 2010/0327838 A1 * | 12/2010 | Melanson | H02M 3/156 323/311 |
| 2011/0305043 A1 * | 12/2011 | Matsumoto | H02M 3/33592 363/21.01 |
| 2013/0093403 A1 * | 4/2013 | Jia | H02M 3/1588 323/272 |
| 2013/0155728 A1 * | 6/2013 | Melanson | H05B 45/10 363/21.16 |
| 2016/0151637 A1 | 6/2016 | Abe et al. | |
| 2020/0021284 A1 | 1/2020 | Thalheim | |
| 2020/0112266 A1 | 4/2020 | Hara | |
| 2021/0328516 A1 | 10/2021 | Balakrishnan et al. | |

OTHER PUBLICATIONS

U.S. Appl. No. 16/795,100, "Notice of Allowance and Fee(s) Due," dated Sep. 17, 2021, 13 pages.
U.S. Appl. No. 16/795,100, "Notice of Allowance and Fee(s) Due," dated Jan. 7, 2022, 12 pages.

* cited by examiner

AUXILIARY CONVERTER TO PROVIDE OPERATING POWER FOR A CONTROLLER

This application claims the benefit of U.S. Provisional Application No. 62/954,807, filed Dec. 30, 2019, which is incorporated in its entirety herein by reference.

BACKGROUND OF THE INVENTION

1. Field of the Invention

The present disclosure relates generally to power converters, and more particularly, to controllers for power converters.

2. Discussion of the Related Art

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more signals representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Power converters generally include one or more controllers which sense and regulate the output of the power converter. These controllers generally require a regulated or unregulated voltage source to power the circuit components of the controller. A bypass capacitor coupled to a controller may provide operating power to the circuits of the controller.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
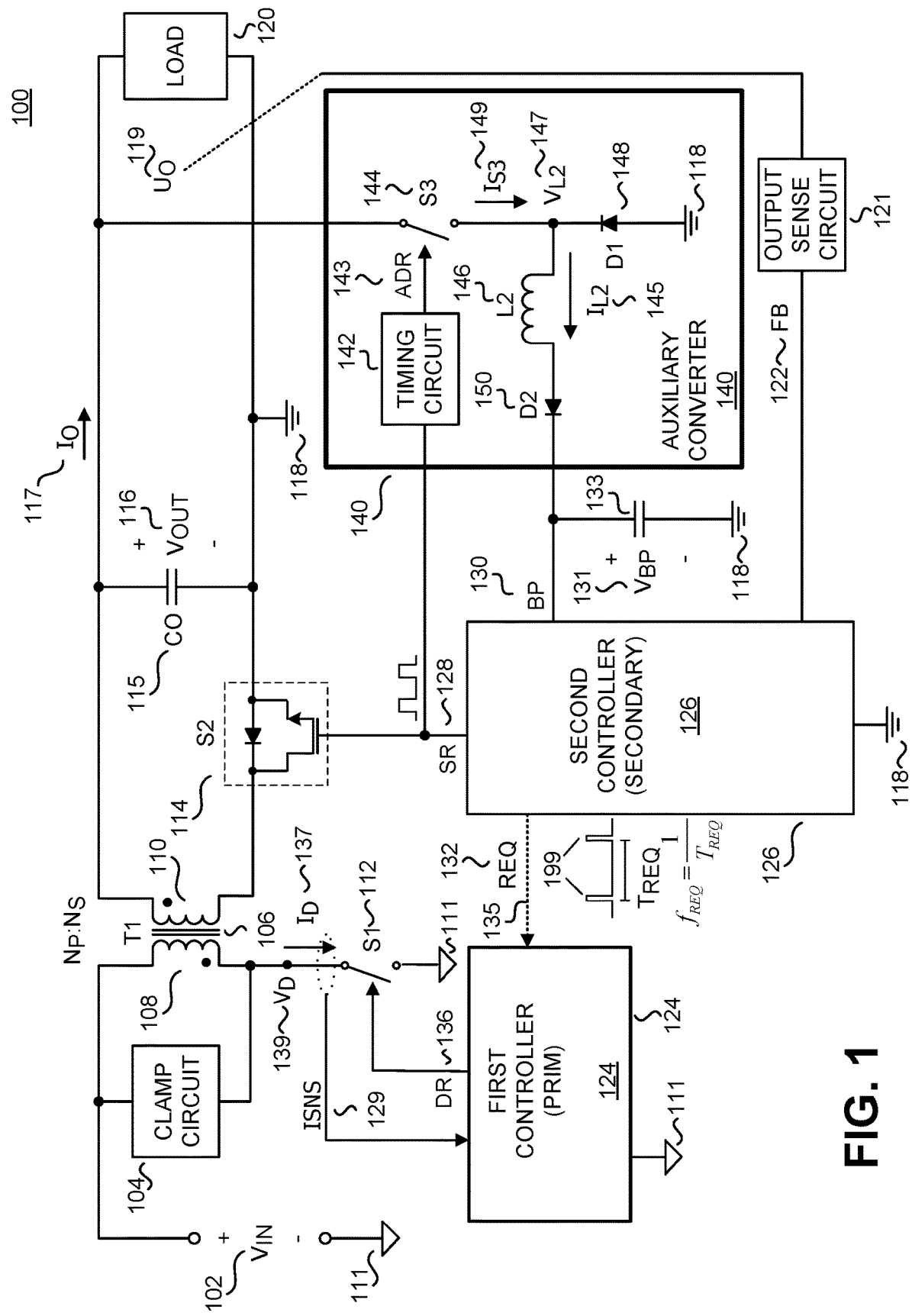
FIG. 1 is a schematic diagram of an example isolated power converter including an auxiliary converter, in accordance with embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Power converters generally include one or more controllers which sense and regulate the output of the power converter. These controllers generally require a regulated or unregulated voltage source to power the circuit components of the controller. A bypass capacitor coupled to a controller may provide operating power to the circuits of the controller.

An isolated power converter may include a primary controller and a secondary controller that are galvanically isolated from one another by an energy transfer element (e.g., a coupled inductor, transformer, etc.). In other words, a dc voltage applied between input side and output side of the power converter will produce substantially zero current.

The primary controller is configured to control a power switch on the primary side of the isolated power converter to control the transfer of energy from the primary winding of the energy transfer element to the secondary winding of the energy transfer element. The secondary controller is coupled to circuit components on the secondary side of the isolated power converter. The secondary controller may also be configured to control a secondary switch coupled to the secondary winding of the energy transfer element, such as a transistor used as a synchronous rectifier for the power converter. Although the primary controller and the secondary controller are galvanically isolated from one another, the secondary controller may transmit a signal to the primary controller that controls how the primary controller switches the power switch to transfer energy to the secondary side.

The secondary side of the isolated power converter includes a bypass capacitor that provides operating power to circuits of the secondary controller. The secondary controller is coupled to the bypass capacitor and generally includes a linear regulator in order to regulate the bypass voltage across the bypass capacitor at a sufficient level to operate circuits of the secondary controller. For example, the bypass voltage may be regulated to substantially 4.4 volts (V).

In general, the source which charges the bypass capacitor may be significantly higher than the operational level for the bypass voltage. In addition, the source may also be quite variable. For example, the output voltage of the power converter may be utilized to charge the bypass capacitor to a sufficient level to operate the secondary controller. However, for some applications, the output voltage of the power converter may be between 20-30 V and sometimes can reach levels upwards of 40 V. Charge pumps and linear regulators may be utilized to charge the bypass capacitor from a high voltage source, such as the output voltage to the much lower bypass voltage. However, utilization of circuits such as charge pumps and linear regulators can result in excessive dissipation and increased thermals, which can adversely affect the efficiency of the power converter.

Embodiments of the present disclosure utilize an auxiliary converter, such as a buck converter, to derive a low voltage supply from a higher voltage rail of a main power converter to provide operational power for a controller of the main power converter. Further, the high voltage rail of the main power converter is also generated by the main power converter. For example, the auxiliary converter can derive the lower, bypass voltage for the bypass capacitor for a secondary controller from the higher voltage rail such as the output voltage of the main power converter. In another example, the auxiliary converter can derive the lower, bypass voltage for a bypass capacitor of a primary controller from a voltage of a bias winding of an energy transfer element of the main power converter. For both of these examples, the output voltage and the bias winding voltage are generated by the main power converter during operation of the main power converter. In examples, the auxiliary converter includes a timing circuit, a switch, and an energy transfer element which are configured to derive the low voltage supply from the higher voltage rail. Further, the drive signal which controls the switching of the switch of the auxiliary converter may be derived from the controller of the power converter, such as a controller on the output side of the power converter (e.g. secondary controller) or a controller on the input side of the power converter (e.g. primary controller). In further examples, the auxiliary converter may be an open-loop converter and the operating frequency of the auxiliary converter is responsive to the operating frequency of the main power converter.

In examples, the timing circuit may generate an auxiliary drive signal to turn on and off the switch of the auxiliary converter. In one example, the timing circuit generates the auxiliary drive signal in response to a secondary drive signal which controls a synchronous rectifier of the power converter. The timing circuit may include a resistor and a capacitor, generally referred to as a resistor-capacitor (RC) circuit and the RC time constant of the RC circuit determines the on-time of the switch of the auxiliary converter. As such, the auxiliary drive signal may derive a low voltage supply from a higher voltage rail of a main power converter to provide operational power for a controller of the main power converter.

FIG. 1 illustrates an example main power converter 100 including an auxiliary converter 140 to derive the bypass voltage VBP 131 of a bypass capacitor 133 which provides supply to a second controller 126 (e.g. secondary controller) of the main power converter 100, in accordance with an embodiment of the present disclosure. The illustrated main power converter 100 includes a clamp circuit 104, energy transfer element T1 106, an input winding 108 of the energy transfer element T1 106, an output winding 110 of the energy transfer element T1 106, a power switch S1 112, an input return 111, an output rectifier S2 114, an output capacitor CO 115, an output sense circuit 121, a second controller 126, a first controller 124, a bypass capacitor 133 (e.g. supply capacitor for the second controller 126), and the auxiliary converter 140. The auxiliary converter 140 is shown as including a timing circuit 142, auxiliary power switch S3 144, an energy transfer element L2 146, and diodes D1 148 and D2 150. A communication link 135 between the second controller 126 and the first controller 124 is also illustrated.

Further shown in FIG. 1 are an input voltage $V_{IN}$ 102, an output voltage VOUT 116, an output current $I_O$ 117, an output quantity UO 119, a feedback signal FB 122, a bypass voltage VBP 131, a request signal REQ 132, a current sense signal ISNS 129, a switch current ID 137, a power switch voltage $V_D$ 139, a primary drive signal DR 136, a secondary drive signal 128, an auxiliary drive signal ADR 143, energy transfer element current IL2 145, an auxiliary voltage VL2 147, and an auxiliary switch current IS3 149.

In the illustrated example, the main power converter 100 is shown as having a flyback topology. Further, the input of main power converter 100 is galvanically isolated from the output of the main power converter 100, such that input return 111 is galvanically isolated from output return 118. Since the input and output of main power converter 100 are galvanically isolated, there is no direct current (dc) path across the isolation barrier of energy transfer element T1 106, or between input winding 108 and output winding 110, or between input return 111 and output return 118. It is appreciated that other known topologies and configurations of power converters may also benefit from the teachings of the present disclosure.

The main power converter 100 provides output power to a load 120 from an unregulated input $V_{IN}$ 102. In one embodiment, the input $V_{IN}$ 102 is a rectified and filtered ac line voltage. In another embodiment, the input voltage $V_{IN}$ 102 is a dc input voltage. The input $V_{IN}$ 102 is coupled to the energy transfer element 106. In some embodiments, the energy transfer element 106 may be a coupled inductor, transformer, or an inductor. The example energy transfer element 106 is shown as including two windings, an input winding 108 (also referred to as a primary winding) and an output winding 110 (also referred to as a secondary winding). However, the energy transfer element 106 may have more than two windings. The input winding 108 of the energy transfer element is further coupled to the power switch S1 112 and the power switch S1 112 is further coupled to input return 111. The voltage at the drain of the power switched S1 112 is denoted as power switch voltage $V_D$ 139. Coupled across the input winding 108 is the clamp circuit 104. The clamp circuit 104 limits the maximum voltage on the power switch S1 112. Further, when the clamp circuit 114 includes active circuit components, such as a switch, the clamp circuit 114 may facilitate zero voltage switching of the power switch S1 112.

Output winding 110 is coupled to the output rectifier S2 114, which is exemplified as a transistor used as a synchronous rectifier. However, the output rectifier S2 114 may also be a diode. Output capacitor CO 115 is shown as being coupled to the output rectifier S2 114 and the output return 118. The main power converter 100 further includes circuitry to regulate the output quantity UO 119, which in one example may be the output voltage $V_{OUT}$ 116, output current $I_O$ 117, or a combination of the two. The output sense circuit 121 is configured to sense the output quantity UO 119 to provide the feedback signal FB 122, representative of the output of the main power converter 100, to the second controller 126.

The second controller 126 is configured to output the secondary drive signal SR 128 and the request signal REQ 132 in response to the feedback signal FB 122. The secondary drive signal SR 128 is received by the output rectifier S2 114 and controls the turn on and turn off of the output rectifier S2 114. In one example, the secondary drive signal SR 128 is a rectangular pulse waveform of varying lengths of logic high and logic low sections. Logic high sections may correspond with the output rectifier S2 114 being on while logic low sections correspond with the output rectifier S2 114 being off. Further, the period of the secondary drive signal SR 128 (e.g. the duration between consecutive leading or trailing edges in the secondary drive signal SR 128), may be referred to as the switching period TSW representative of the operation period (or frequency) of the main power converter. In one example, the secondary drive signal SR 128 and the primary drive signal DR 136 have substantially the same switching period.

The request signal REQ 132 is representative of a request to turn on the power switch S1 112. The request signal REQ 132 may include request events 199 which are generated in response to the feedback signal FB 122. In one example, the second controller 126 is configured to compare the feedback signal FB 122 with a regulation reference. In response to the comparison, the second controller 126 may output a request event 199 in the request signal REQ 132. The request signal REQ 132 may be a rectangular pulse waveform which pulses to a logic high value and quickly returns to a logic low value. The logic high pulses may be referred to as request events 199. In other embodiments it is understood that request signal REQ 132 could be an analog, continually varying signal, rather than a pulsed waveform, while still benefiting from the teachings of the present disclosure.

The first controller 124 is coupled to receive a current sense signal ISNS 129 representative of the switch current ID 137 of the power switch S1 112 and the request signal REQ 132 through a communication link 135, shown as a dashed line, and outputs the primary drive signal DR 136. The first controller 124 provides the primary drive signal DR 136 to the power switch S1 112 to control various switching parameters of the power switch S1 112 to control the transfer of energy from the input of to the output of the main power converter 100 through the energy transfer element 106. Example of such parameters include switching frequency (or switching period TSW), duty cycle, on-time and off-times, or varying the number of pulses per unit time of the power switch S1 112. In addition, the power switch S1 112 may be controlled such that it has a fixed switching frequency or a variable switching frequency. In one embodiment, the primary drive signal DR 136 is a rectangular pulse waveform with varying durations of logic high and logic low sections, logic high sections corresponding to the power switch S1 112 being ON and logic low sections corresponding to the power switch S1 112 being OFF. In one embodiment, the first controller 124 outputs the primary drive signal DR 136 to turn ON the power switch S1 112 in response to a request event 199 in the request signal REQ 132. The first controller 124 outputs the primary drive signal DR 136 to turn OFF the power switch S1 112 when the switch current ID 137 provided by the current sense signal ISNS 129 reaches a current limit.

If the clamp circuit 104 includes active components, such as a transistor, the first controller 124 may also output a clamp drive signal (not shown). The clamp drive signal could control various switching parameters of a clamp switch included in the clamp circuit 104, such as the on-times or off-times of the clamp switch. In one example, in response to a request event 199 in the request signal REQ 132, the first controller 124 outputs the clamp drive signal to turn on the clamp switch for a duration which may be selected such that sufficient charge is provided from the clamp circuit 104 to the input winding 108 to discharge the parasitic capacitance of the power switch S1 112. Once the first controller 124 turns off the clamp switch of the clamp circuit 104, the first controller 124 outputs the primary drive signal DR 136 to turn on the power switch S1 112.

The second controller 126 and the first controller 124 may communicate via the communication link 135. For the example shown, the second controller 126 is coupled to the secondary side of the main power converter 100 and is referenced to the output return 118 while the first controller 124 is coupled to the primary side of the main power converter 100 and is referenced to the input return 111. In embodiments, the first controller 124 and the second controller 126 are galvanically isolated from one another and the communication link 135 provides galvanic isolation using an inductive coupling, such as a transformer or a coupled inductor, an optocoupler, capacitive coupling, or other device that maintains the isolation. However, it should be appreciated that in some embodiments, the second controller 126 is not galvanically isolated from the first controller 124.

In one example, the first controller 124 and second controller 126 may be formed as part of an integrated circuit that is manufactured as either a hybrid or monolithic integrated circuit. In one example, the power switch S1 112 may also be integrated in a single integrated circuit package with the first controller 124 and the second controller 126. In addition, in one example, first controller 124 and second controller 126 may be formed as separate integrated circuits. The power switch S1 112 may also be integrated in the same integrated circuit as the first controller 124 or could be formed on its own integrated circuit. Further, it should be appreciated that both the first controller 124, the second controller 126 and power switch S1 112 need not be included in a single package and may be implemented in separate controller packages or a combination of combined/separate packages.

It is generally understood that a switch that is closed may conduct current and is considered on, while a switch that is open cannot conduct current and is considered off. In one example, the power switch S1 112 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT).

The main power converter 100 further includes the auxiliary converter 140 coupled to the output capacitor CO 115. The auxiliary converter 140 is further coupled to the bypass capacitor 133 and a bypass terminal BP 130 of the second controller 126. In embodiments, the auxiliary converter 140 provides a low voltage supply (e.g. bypass voltage VBP 131) from a higher voltage rail (e.g. output voltage VOUT 116) of the main power converter 100 to provide operational power. For the example shown, the auxiliary converter 140 provides the bypass voltage VBP 131 for the second controller 126 from the output voltage VOUT 116 of the main power converter 100.

The auxiliary converter 140 is shown as including the timing circuit 142, auxiliary power switch S3 133, energy transfer element L2 146 (exemplified as an inductor), freewheeling diode D1 148, and diode D2 150. The auxiliary drive signal ADR 143 which controls the switching of the auxiliary power switch S3 144 may be derived from the first controller 124 or the second controller 126. In the example shown, the auxiliary drive signal ADR 143 is derived from the second controller 126, specifically, the secondary drive signal SR 128.

In the example shown, the auxiliary converter 140 is coupled in a buck converter configuration with the output capacitor CO 115 and output voltage VOUT 116 as its input and the bypass capacitor 133 and bypass voltage VBP 131 at its output. The auxiliary converter 140 is also an open-loop converter and the operating frequency of the auxiliary power switch S3 144 is responsive to the operating frequency of the switches of the main power converter 100 (e.g. power switch S1 112 or output rectifier S2 114). As mentioned above, the output voltage VOUT 116 is a voltage generated by the main power converter 100.

The timing circuit 142 is coupled to the second controller 126 and configured to generate the auxiliary drive signal ADR 143 in response to the secondary drive signal SR 128. The timing circuit 142 may also be referred to as an auxiliary drive circuit which is configured to control the switching of auxiliary power switch S3 144. In one example, the timing circuit 142 is capacitively coupled to the second controller 126. In another example, the timing circuit is directly coupled to the second controller 126. The auxiliary drive signal ADR 143 controls the switching of the auxiliary power switch S3 144. In embodiments, the timing circuit determines the on-time or off-time of the auxiliary power switch S3 144 in response to the secondary drive signal SR 128. However, it should be appreciated that in other embodiments the timing circuit 142 may be coupled to receive other signals than the secondary drive signal SR 128 which are representative of the operational frequency of the main power converter 100. For example, the timing circuit 142 could be coupled to a winding of the energy transfer element T1 106, such as a tertiary winding or from a tapped node of the output winding 110, or a tapped node of the input winding 108. It is appreciated that in other examples, the secondary drive signal SR 128 could be replaced with a switching edge waveform generated from an auxiliary winding of the main converter energy transfer element T1 106 of the main power converter 100.

Auxiliary power switch S3 144 is coupled to the input of the auxiliary converter and the output capacitor CO 115 of the main power converter. Auxiliary power switch S3 144 is further coupled to the energy transfer element L2 146. Auxiliary power switch S3 144 may be a transistor such as a metal-oxide-semiconductor field-effect transistor (MOS-FET), bipolar junction transistor (BJT), silicon carbide (SiC) based transistor, gallium nitride (GaN) based transistor, or an insulated-gate bipolar transistor (IGBT).

Freewheeling diode D1 148 is coupled to the auxiliary power switch S3 144 and output return 118. The energy transfer element L2 146 is coupled to diode D2 150 which is coupled to the bypass terminal BP 130 and bypass capacitor 133. Auxiliary power switch S3 144, freewheeling diode D1 148, and the energy transfer element L2 are shown as coupled in a buck converter configuration. The diode D2 150 is coupled as a blocking diode to prevent current from flowing from the output of the auxiliary converter 140 to the input of the auxiliary converter 140. Or in other words, the diode D2 15 prevents current from flowing from the bypass capacitor 133 to the output capacitor CO 115 in the event that the output voltage VOUT 116 falls below the bypass voltage VBP 131. It is appreciated that in main power converters where the output voltage VOUT 116 will be operated in a range such that the output voltage VOUT 116 is always greater than the bypass voltage VBP 131, the diode D2 150 could be omitted from auxiliary converter 140 while still maintaining the benefits of the present invention.

In operation, the timing circuit 142 outputs the auxiliary drive signal ADR 143 to turn on the auxiliary power switch S3 144. When the auxiliary power switch S3 144 is on, the output capacitor CO 115 is coupled to the energy transfer element L2 146 and substantially the output voltage VOUT 116 minus the sum of the bypass voltage VBP 131 and the voltage drop across diode D2 150 is applied across the energy transfer element L2 146. Energy transfer element L2 146 is exemplified as an inductor. As such, the current IL2 145 of inductor L2 146 is substantially a function of the voltage across the inductor L2 146 divided by the inductance of inductor L2 146 multiplied by the on-time of the auxiliary power switch S3 144. In one example, when the auxiliary power switch S3 144, the inductor current IL2 145 linearly increases and flows from the auxiliary switch S3 144 to the bypass capacitor 133. Further, the inductor current IL2 145 and the auxiliary switch current IS3 149 are substantially the same.

The timing circuit 142 outputs the auxiliary drive signal to turn off the auxiliary power switch S3 144. As such, the auxiliary switch current IS3 149 falls to zero and the inductor current IL2 145 linearly decreases as a function of the voltage across the inductor L2 146 divided by the inductance of inductor L2 146 until the inductor current IL2 145 reaches zero or the auxiliary power switch S3 144 turns on. The inductor current IL2 145 flows from the freewheeling diode D1 148 to the bypass capacitor 133. As shown, the diode D1 148 is coupled to provide a path for the inductor current IL2 145 when the timing circuit 142 turns off the auxiliary switch S3 144. Or in other words, the diode D1 148 allows the inductor current IL2 145 to freewheel through the auxiliary converter 140.

Figure 2A:
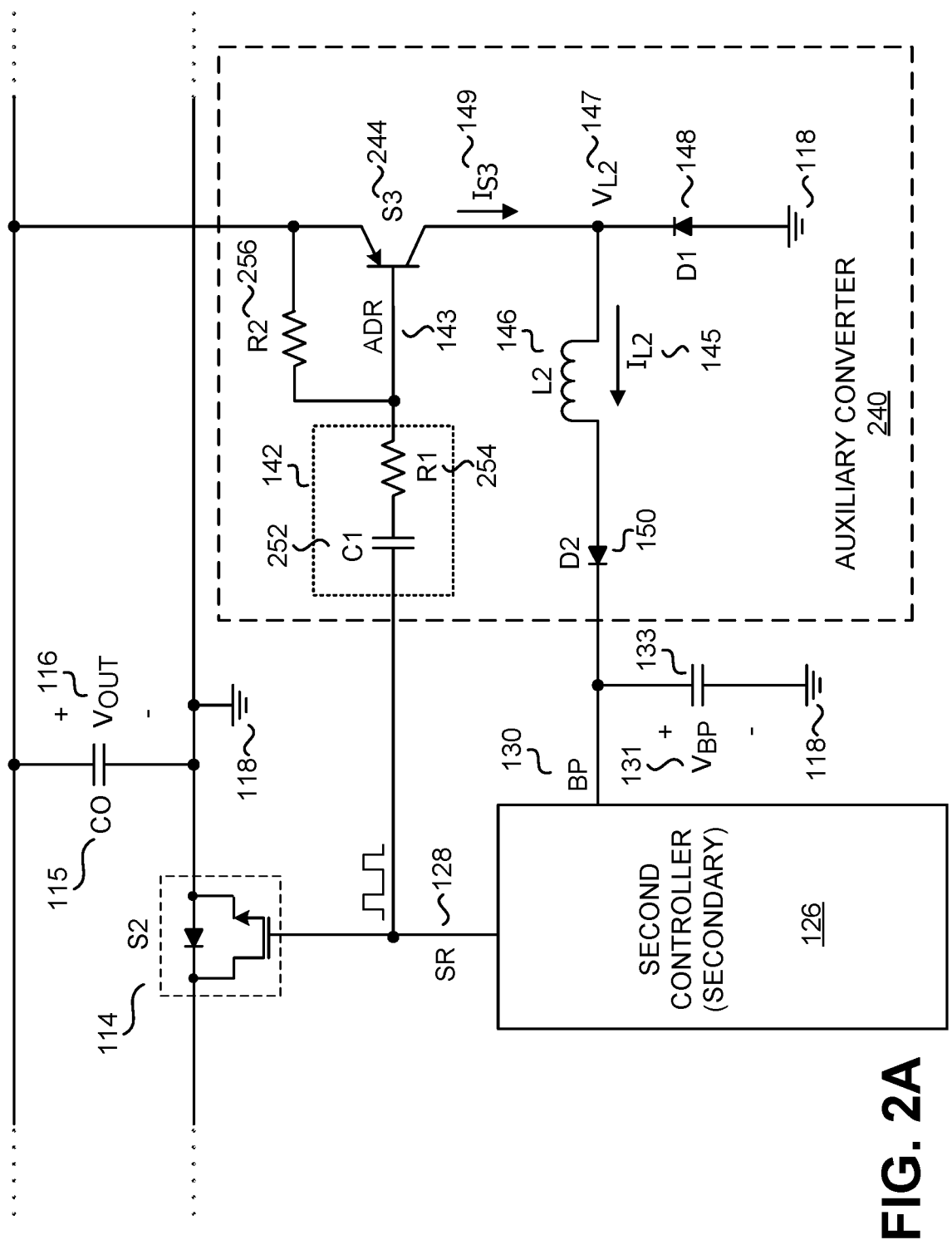
FIG. 2A is a schematic diagram of an example auxiliary converter of FIG. 1, in accordance with embodiments of the present disclosure.

FIG. 2A illustrates one example of the auxiliary converter 240 which could be used with the main power converter 100 of FIG. 1. It should be appreciated that similarly named and numbered elements couple and function as described above. Further, portions of the main power converter, such as output rectifier S2 114 and output capacitor CO 115 have been reproduced in FIG. 2A to provide context for the coupling of the auxiliary converter 240.

For the example shown, timing circuit 142 includes a capacitor C1 252 and resistor R1 254. As such, the auxiliary converter 240 is capacitively coupled to receive the secondary drive signal SR 128 from the second controller 126. Auxiliary power switch S3 244 is exemplified as a pnp BJT with the emitter terminal coupled to the output capacitor CO 115 and the collector terminal coupled to the energy transfer element L2 146 (e.g. inductor L2 146) and the freewheeling diode D1 148. Specifically, the collector terminal of the auxiliary power switch S3 244 is coupled to the cathode of freewheeling diode D1 148. The base terminal of the auxiliary power switch S3 244 is coupled to receive the auxiliary drive signal ADR 143. Further, coupled between the base terminal and the emitter terminal is resistor R2 256. As shown, the auxiliary switch current IS3 149 is substantially the collector current of the pnp BJT while the auxiliary voltage VL2 146 is substantially the collector voltage of the pnp BJT. For the example of an output voltage VOUT 116 between 20-40V with a 2.2 microfarad (µF) bypass capacitor 133, the inductance of inductor L2 146 is substantially 470 microhenries (µH), capacitance of capacitor C1 is substantially equal to 470 picofarad (pF), the resistance of resistor R1 is substantially equal to 1 kiloohm (kΩ), the resistance of resistor R2 is substantially equal to 1.5 kΩ, and the auxiliary power switch S3 244 may be a 2N2907 transistor. Diodes D1 148 and D2 150 may be small signal didoes Resistor R1 254 and capacitor C1 252 forms an RC circuit. The RC time constant of resistor R1 254 and capacitor C1 252 determines the on-time of the auxiliary power switch S3 244. The values of resistor R1 254 and capacitor C1 252 may be selected based on the amount of step down from the output voltage VOUT 116 to the bypass voltage VBP 131. For example, the output voltage VOUT 116 may be between 20-40V while the bypass voltage VBP 131 is regulated to substantially 4.4V. In one example, the values for the resistor R1 254 and capacitor C1 252 and may selected such that 2-2.5 time constants is substantially equal to 1-2 milliseconds (µs).

Resistor R2 256 facilitates the turn off of the auxiliary power switch S3 244 and provides a discharge path to reset the capacitor C1 252. The RC time constant of resistors R1 254, R2 256 and capacitor C1 252 determines the duration of time to reset the capacitor C1 252. As will be further discussed with respect to FIG. 2B, the capacitor C1 252 is reset when the secondary drive signal SR 128 turns on the output rectifier S2 114.

Figure 2B:
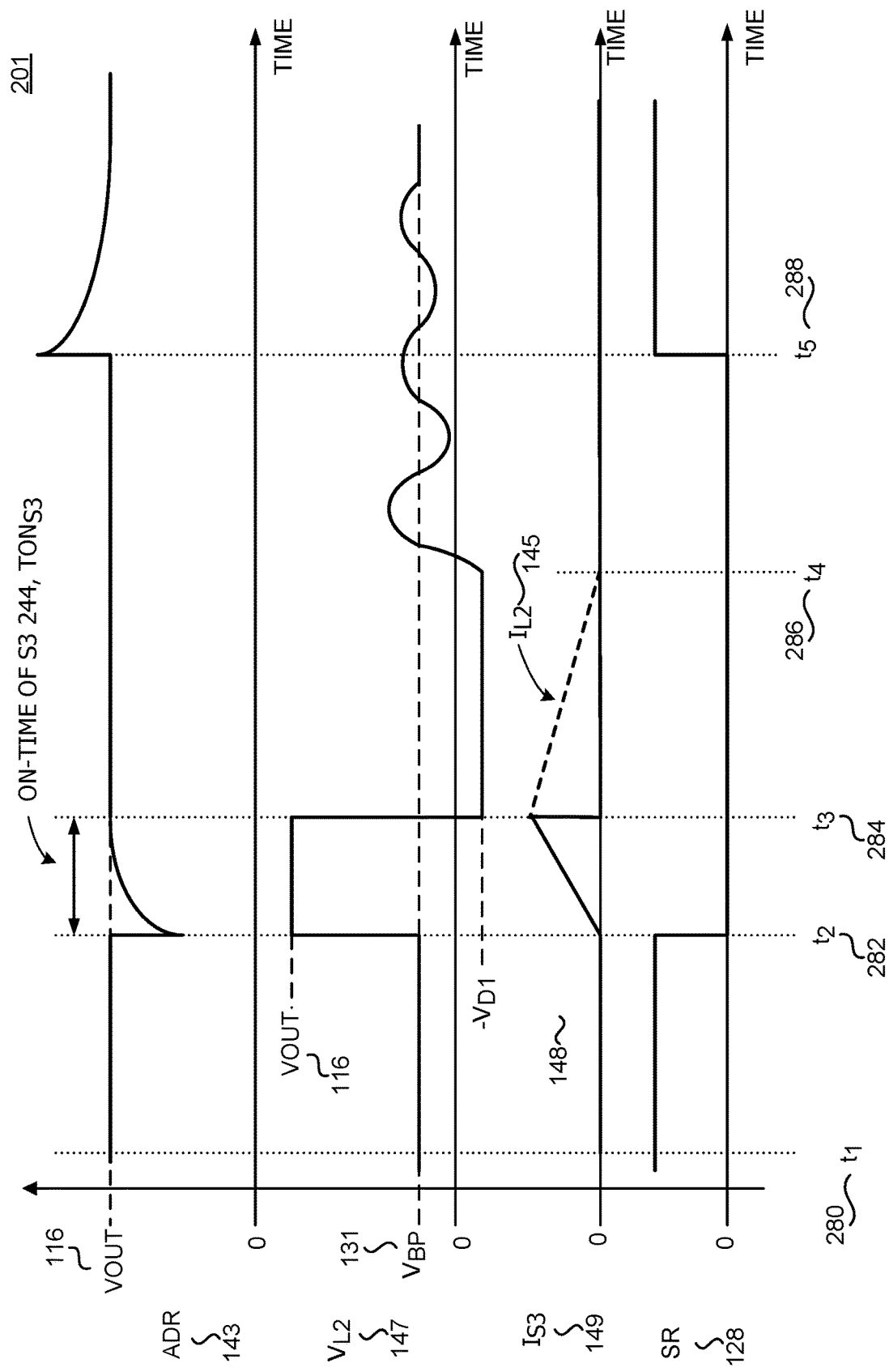
FIG. 2B is a timing diagram illustrating example waveforms of the auxiliary converter of FIG. 2A, in accordance with embodiments of the present disclosure.

FIG. 2B illustrates timing diagram 201 with example waveforms for the auxiliary drive signal ADR 143 (e.g. exemplified as the base voltage of the auxiliary switch S3 244), auxiliary voltage VL2 147 (e.g. collector voltage of the auxiliary switch S3 244), auxiliary switch current IS3 149 (e.g. collector current of the auxiliary switch S3 244), energy transfer element current IL2 145 (e.g. current of the inductor L2 146), and secondary drive signal SR 128.

In the example shown, at time $t_1$ 280, the secondary drive signal SR 128 is already logic high, indicating the output rectifier S2 114 is on. After time $t_1$ 280, the, the auxiliary drive signal ADR 143 is substantially equal to the output voltage VOUT 116 and the auxiliary voltage VL2 147 is substantially equal to the bypass voltage VBP 131. Further, both the auxiliary switch current IS3 149 and the energy transfer element current IL2 145 are substantially zero.

At time $t_2$ 282, the secondary drive signal SR 128 transitions to a logic low value, indicating the turn off the output rectifier S2 114. Resistor R1 254 and capacitor C1 252 provide the drive current to the auxiliary power switch S3 244 (exemplified pnp BJT) and the time constant of resistor R1 254 and capacitor C1 252 determine the on-time of the auxiliary power switch S3 244. As shown at time $t_2$ 282, the auxiliary drive signal ADR 143 decreases and then increases to the output voltage VOUT 116. The duration it takes to increase to the output voltage VOUT 116 is responsive the time constant of resistor R1 254 and capacitor C1 252. As shown, the auxiliary power switch S3 244 remains on if the difference between the output voltage VOUT 116 and the value of the auxiliary drive signal ADR 143 is greater than the base-emitter threshold of the auxiliary power switch S3 244. Further, the auxiliary voltage VL2 147 substantially increases to the output voltage VOUT 116 at time $t_2$ 282 and remains at the output voltage VOUT 116 for the remainder of the conduction (e.g. on-time) of the auxiliary power switch S3 244. Both the auxiliary switch current IS3 149 and the energy transfer element current IL2 145 linearly increase during the on-time of the auxiliary power switch S3 244. As mentioned above, the rate of increase is a function of the voltage across the inductor L2 146 divided by the inductance of the inductor L2 146.

At time $t_3$ 284, the capacitor C1 252 has discharged through resistor R1 254 and the auxiliary drive signal ADR 143 substantially reaches the output voltage VOUT 116 and the auxiliary power switch S3 244 stops conducting (e.g. turns off). The auxiliary voltage VL2 147 is substantially equal to the output return 118 minus the voltage drop across the freewheeling diode D1 148 (e.g. $-V_{D1}$). The auxiliary switch current IS3 149 also falls to substantially zero. However, the energy transfer element current IL2 145 freewheels through diode D1 148 and the energy transfer element current IL2 145 linearly decreases. The rate of decrease is substantially a function of the voltage across the inductor L2 146 divided by the inductance of the inductor L2 146. For the example shown, the energy transfer element current IL2 145 decreases to substantially zero at time $t_4$ 286. If the energy transfer element current IL2 145 decreases to substantially zero, the auxiliary converter 240 is operating in discontinuous conduction mode (DCM). Further a relaxation ring can be observed at the auxiliary voltage VL2 147 once the energy transfer element current IL2 145 reaches zero. After time $t_4$ 280, the auxiliary voltage VL2 147 oscillates around the bypass voltage VBP 131. For the example shown the oscillation dampens to the bypass voltage VBP 131 before the auxiliary switch S3 244 is turned on in a subsequent cycle, however it should be appreciated that the oscillation may continue until the auxiliary switch S3 244 is turned on in a subsequent cycle.

At time $t_5$ 288, the secondary drive signal SR 128 transitions to a logic high value, indicating the turn on of the output rectifier S2 114. When the secondary drive signal SR 128 transitions to a logic high value at time $t_5$ 288, the auxiliary drive signal ADR 143 increases and then decreases in response to the RC time constant of capacitance C1 252 and resistors R1 254 and R2 256. In one example, the auxiliary drive signal ADR 143 increases above the emitter reference of the auxiliary power switch S3 244 by the bypass voltage VBP 131. The capacitance C1 252 discharges to through resistor R1 254 and R2 256 to substantially the output voltage VOUT 116, which resets the voltage across capacitance C1 252, allowing it be ready for the next trailing edge of the secondary drive signal SR 128.

The amount of power delivered by the auxiliary converter 240 is substantially a function of the voltage across the inductor L2 146 during the on-time of the auxiliary power switch S3 244, the inductance of inductor L2 146, and the switching frequency fsw of the secondary drive signal SR 128, or mathematically:

$$W_{BP} = \frac{((V_{OUT} - V_{BP})TON_{S3})^2}{2L_2} f_{SW} \quad (1)$$

Figure 3:
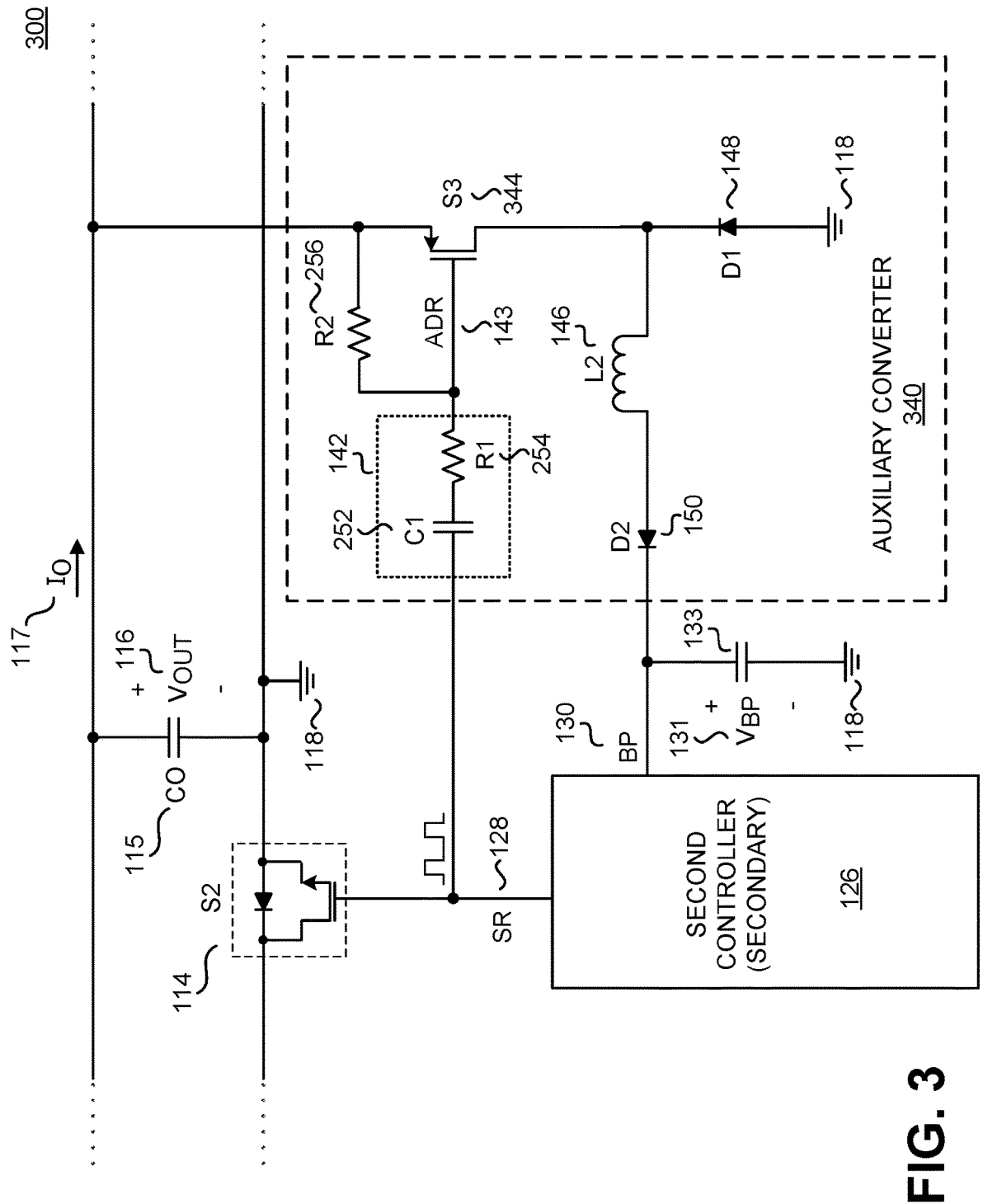
FIG. 3 is a schematic diagram of another example auxiliary converter of FIG. 1, in accordance with embodiments of the present disclosure.

FIG. 3 illustrates another example auxiliary converter 340 which could be used with the main power converter 100 of FIG. 1. It should be appreciated that similarly named and numbered elements couple and function as described above. Further, portions of the main power converter, such as output rectifier S2 114 and output capacitor CO 115 have been reproduced in FIG. 3 to provide context for the coupling of the auxiliary converter 340. Further, the auxiliary converter 340 is similar to the auxiliary converter 240 shown in FIG. 2A. At least one difference, however, is the auxiliary power switch S3 344 is exemplified as a p-type MOSFET (PMOS). As shown, the source terminal of the auxiliary power switch S3 344 is coupled to the input of the auxiliary converter 340, which is coupled to output capacitor CO 115, the drain terminal of the auxiliary power switch S3 344 is coupled to the energy transfer element L2 146 and the cathode of the freewheeling diode D1 148, the gate terminal of the auxiliary power switch S3 344 is coupled to the timing circuit 142, shown as resistor R1 254 and capacitor C1 252. For the example shown, the voltage at the gate terminal of the auxiliary power switch S3 344 is the auxiliary drive signal ADR 143. Resistor R2 256 is illustrated as coupled between the drain terminal and source terminal of the auxiliary power switch S3 344.

Figure 4:
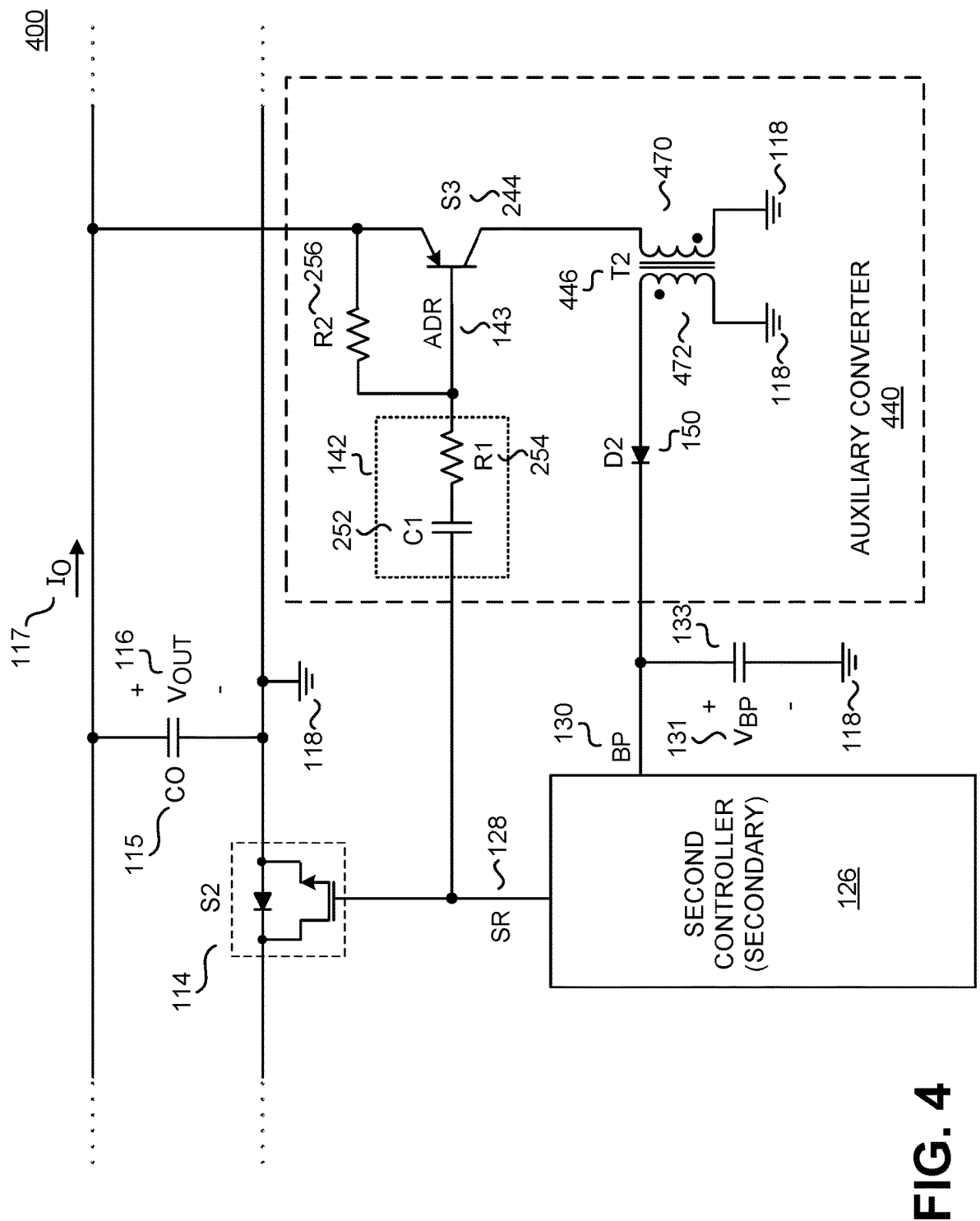
FIG. 4 is a schematic diagram of a further example auxiliary converter of FIG. 1, in accordance with embodiments of the present disclosure.

FIG. 4 illustrates another example auxiliary converter 440 which could be used with the main power converter 100 of FIG. 1. It should be appreciated that similarly named and numbered elements couple and function as described above. Further, portions of the main power converter, such as output rectifier S2 114 and output capacitor CO 115 have been reproduced in FIG. 4 to provide context for the coupling of the auxiliary converter 440. Further, the auxiliary converter 440 is similar to the auxiliary converter 240 shown in FIG. At least one difference, however, is the energy transfer element 446 is exemplified as a coupled inductor T2 446 with a first winding 470 and a second winding 472. Similar to above, the auxiliary power switch S3 244 is shown as a pnp BJT. The collector terminal of the auxiliary power switch S3 244 is coupled to one end of the first winding 470. The other end of the first winding 470 is coupled to the output return 118. The diode D2 150 is coupled to one end of the second winding 472 while the other end of the second winding 427 is coupled to output return 118. The auxiliary converter 440 is coupled similarly to a flyback converter and functions accordingly. However, it should be appreciated that other polarities for the coupled inductor T2 446 could be utilized. For example, the polarities for the coupled inductor T2 446 could be selected to allow for the auxiliary converter 440 to function as a forward converter.

Figure 5:
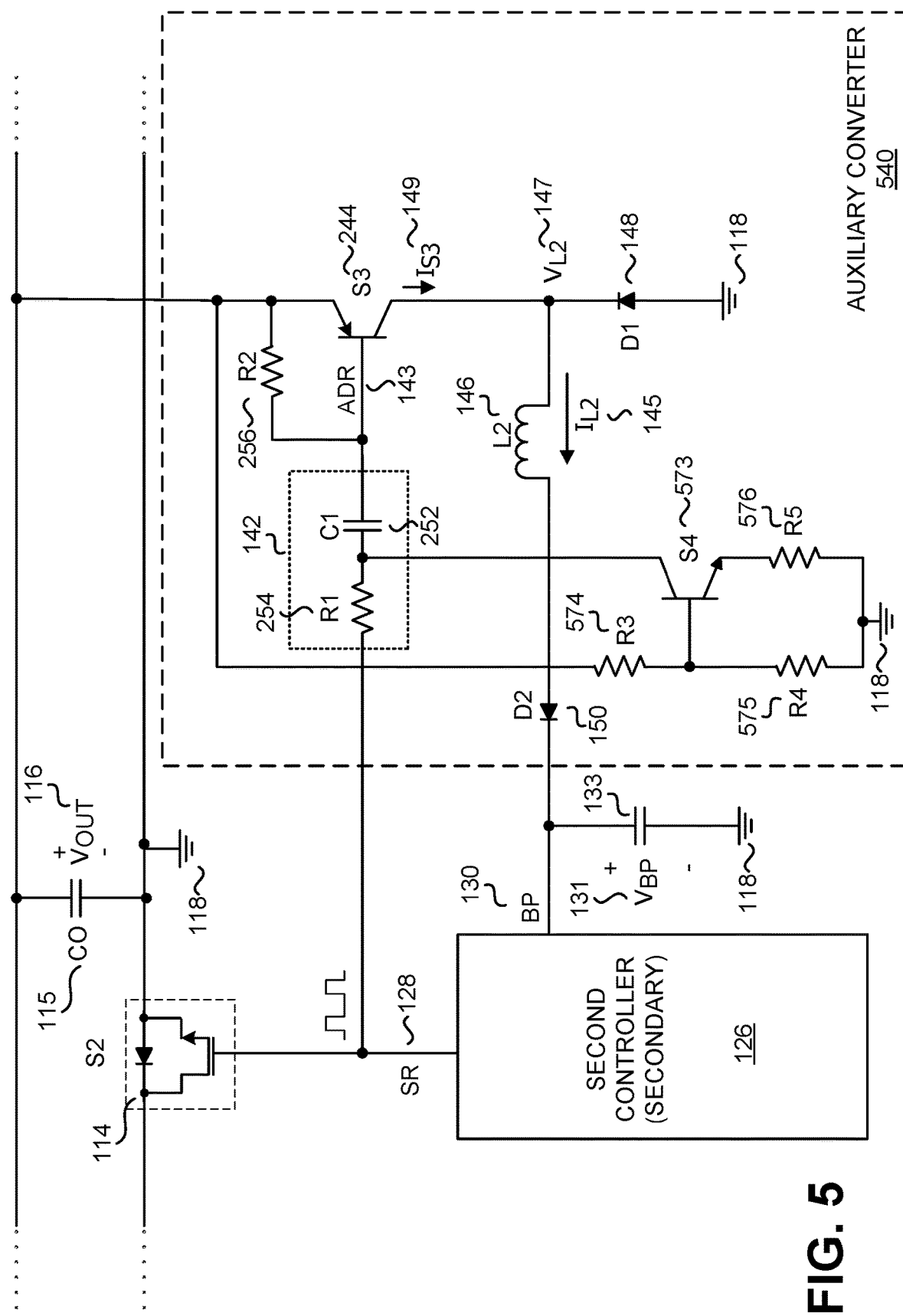
FIG. 5 is a schematic diagram of an even further example auxiliary converter of FIG. 1, in accordance with embodiments of the present disclosure.

FIG. 5 illustrates another example auxiliary converter 540 which could be used with the main power converter 100 of FIG. 1. It should be appreciated that similarly named and numbered elements couple and function as described above. Further, portions of the main power converter, such as output rectifier S2 114 and output capacitor CO 115 have been reproduced in FIG. 5 to provide context for the coupling of the auxiliary converter 540. Further, the auxiliary converter 540 is similar to the auxiliary converter 240 shown in FIG. 2A. At least one difference, however, is the auxiliary converter 540 further includes a second auxiliary switch S4 573, and resistors R3 574, R4 575 and R5 576.

Auxiliary switch S3 344 is exemplified as a pnp BJT while the second auxiliary switch S4 573 is exemplified as an npn BJT, however it should be appreciated that other transistors could be utilized. As shown, the base terminal of auxiliary switch S3 244 is coupled to capacitor C1 252 and resistor R2 256. Further, resistor R1 254 is coupled to receive second controller 126 and receives the secondary drive signal SR 128. Second auxiliary switch S4 573 is coupled to the node between resistor R1 254 and capacitor C1 252. As shown, the collector terminal of second auxiliary switch S4 573 is coupled to the node between resistor R1 254 and capacitor C1 252. The base terminal of second auxiliary switch S4 573 is coupled to both resistors R3 574 and R4 575. As shown, resistors R3 574 and R4 575 are coupled as a resistor divider for the input of the auxiliary converter 540. The input of the auxiliary converter 540 is coupled to the output of power converter 500. As such, resistors R3 574 and R4 575 are coupled as a resistor divider for the output voltage VOUT 116. Resistor R5 576 is coupled to the emitter terminal of auxiliary switch S4 573. Both resistors R4 575 and R5 576 are coupled to output return 116. However, it should be appreciated that resistor R5 576 may be optional.

In general, an auxiliary converter without the second auxiliary switch S4 573, and resistors R3 574, R4 575 and R5 576 has a substantially constant on-time for the auxiliary switch S3 244 regardless of the input to the auxiliary converter (e.g. the output voltage VOUT 116). As such, the energy transfer element current IL2 145 generally increases as the output voltage VOUT 116 increases which could correlate to more energy provided by the auxiliary converter. In operation, the second auxiliary switch S4 573, and resistors R3 574, R4 575 and R5 576 are configured to reduce the on-time of the auxiliary switch S3 244 as the input to auxiliary converter 540 (e.g., output voltage VOUT 116 for this example) increases. In operation, when the second auxiliary switch S4 573 is on, the voltage at the node between resistor R1 254 and C1 252 can decrease. The amount which the voltage at that node decreases is a function of the input to the auxiliary converter (e.g. output voltage VOUT 116). The greater the input (e.g. the output voltage VOUT 116), the more current that is pulled by the second auxiliary switch S4 573 and the lower the voltage at the node between resistor R1 254 and C1 252. As such, second auxiliary switch S4 573, and resistors R3 574, R4 575 and R5 576 can reduce the on-time for the auxiliary power switch S3 244 as the output voltage VOUT 116 increases. By reducing the on-time of the auxiliary switch S2 233, the peak energy transfer element current IL2 145 may compensated with increasing output voltages VOUT 116 and the peak energy transfer element current IL2 145 may be relatively independent of the output voltage VOUT 116. In one example, auxiliary converter 540 could provide constant power to its output (e.g. bypass capacitor 133 and bypass terminal BP 130) regardless of the value of the output voltage VOUT 116.

Figure 6:
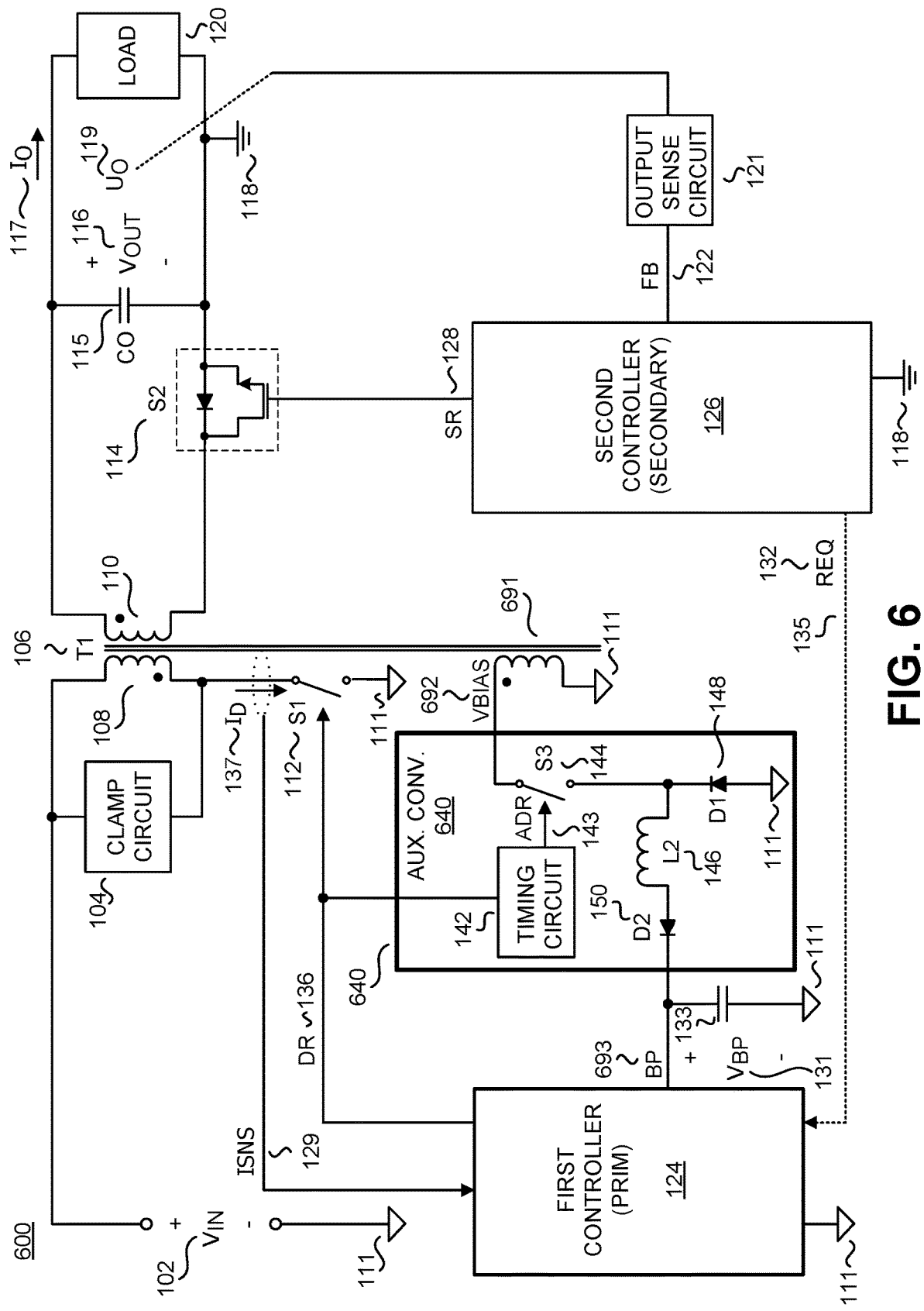
FIG. 6 is a schematic diagram of another example isolated power converter including an auxiliary converter, in accordance with embodiments of the present disclosure.

FIG. 6 illustrates another example main power converter 600 including an auxiliary converter 640 to derive the bypass voltage VBP 131 of a bypass capacitor 133 which provides supply to a first controller 124 (e.g. primary controller) of the main power converter 600, in accordance with an embodiment of the present disclosure. In other words, the auxiliary converter 640 could be coupled to the input side of the power converter 600 to provide an efficient power source for the first controller 124 and provide operating current to the first controller 124.

It should be appreciated that the main power converter 600 and auxiliary converter 640 shares many similarities with the main power converter 100 and auxiliary converter 140 shown with respect to FIG. 1, and similarly named and numbered elements couple and function as described above. At least one difference however, is the input of the auxiliary converter 640 is coupled to a third winding 691 of the energy transfer element 106 of the main power converter 600 and the auxiliary converter 640 provides operational power for circuits of the first controller 124. As such, the bypass voltage VBP 131 of the bypass capacitor 133 is derived from the bias voltage VBIAS 692 of the third winding 691. The bias voltage VBIAS 692 is further generated by the main power converter 600. Bypass capacitor 133 is coupled to a bypass terminal BP 693 of the first controller 124 to provide operational power for circuits of the first controller. It should further be appreciated that any of the example auxiliary converters discussed above may be used for the auxiliary converter 640 of FIG. 6.

The third winding 691 in the example shown is an input referenced winding of the energy transfer element 106 and is coupled to input return 111. The other end of the third winding 691 is coupled to the input of the auxiliary converter 640 and provide s the voltage rail which the auxiliary converter 640 derives the low voltage supply for the first controller 124. As shown, the third winding 691 is coupled to the auxiliary switch S3 144 of the auxiliary converter 640. The auxiliary converter 640 is further coupled to the first controller 124 to receive the primary drive signal DR 136, which is representative of the operational frequency (e.g. switching frequency fsw) of the main power converter 600. It is appreciated that in other embodiments, auxiliary converter 640 could be coupled to receive an inverted version of the primary drive signal DR 136 while benefiting from the teachings of the present disclosure. The timing circuit 142 may also be referred to as an auxiliary drive circuit which is configured to control the switching of auxiliary power switch S3 144. As shown, the timing circuit 142 is configured to generate the auxiliary drive signal ADR 143 in response to the primary drive signal DR 136. However it should be appreciated that in other examples the primary drive signal DR 136 could be replaced by a switching waveform derived from a winding on the energy transfer element T1 106. As shown, the output of the auxiliary converter 640 is coupled to the bypass terminal BP 693 of the primary controller 124. The output of the auxiliary converter 640 provides operation power/current to the bypass terminal BP 693 of the primary controller 124.

Figure 7:
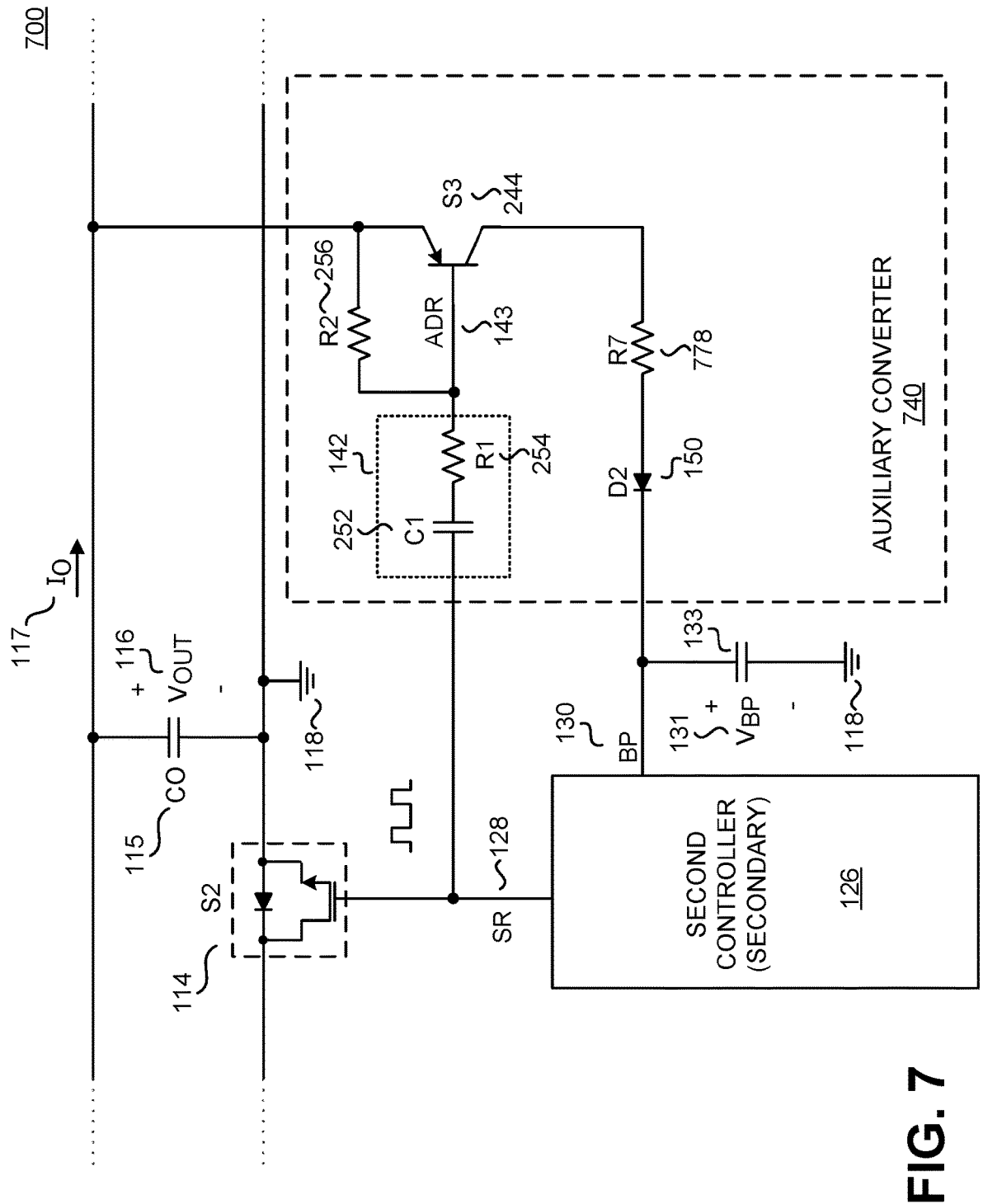
FIG. 7 is a schematic diagram of an example auxiliary converter of FIG. 1, in accordance with embodiments of the present disclosure.

FIG. 7 illustrates an example auxiliary converter 740 which could be used with the main power converter 100 of FIG. 1. It should be appreciated that similarly named and numbered elements couple and function as described above. Further, portions of the main power converter, such as output rectifier S2 114 and output capacitor CO 115 have been reproduced in FIG. 7 to provide context for the coupling of the auxiliary converter 740. Further, the auxiliary converter 740 is similar to the auxiliary converter 240 shown in FIG. 2A. At least one difference, however, is the auxiliary converter 740 includes a resistor R7 778 instead of the energy transfer element L2 146 shown in FIGS. 1 and 2A. As shown, the collector terminal of the auxiliary power switch S3 244 is coupled to the resistor R7 778. The other end of resistor R7 778 is coupled to diode D2 150. In operation, the timing circuit 142 outputs the auxiliary drive signal ADR 143 to turn on the auxiliary power switch S3 144 in response to the secondary drive signal SR 128. When the auxiliary power switch S3 144 is on, the output capacitor CO 115 is coupled to the resistor R7 778 and substantially the output voltage VOUT 116 minus the sum of the bypass voltage VBP 131 and the voltage drop across diode D2 150 is applied across the resistor R7 778. With the resistor R7 778, the bypass capacitor 133 may be pulse charged from the output voltage VOUT 116.

Figure 8:
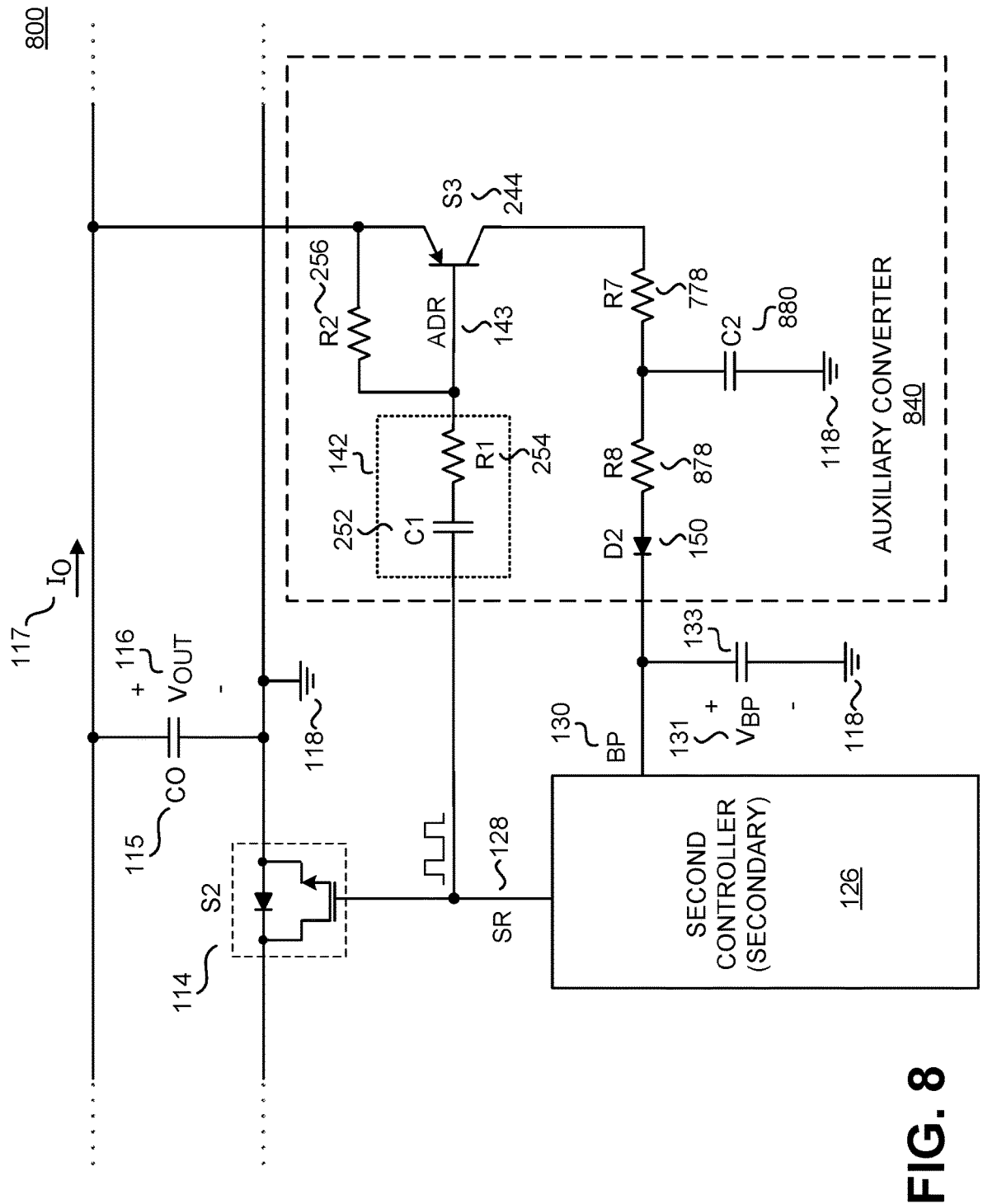
FIG. 8 is another example auxiliary converter of FIG. 1, in accordance with embodiments of the present disclosure.

FIG. 8 illustrates an example auxiliary converter 840 which could be used with the main power converter 100 of FIG. 1. It should be appreciated that similarly named and numbered elements couple and function as described above. Further, portions of the main power converter, such as output rectifier S2 114 and output capacitor CO 115 have been reproduced in FIG. 8 to provide context for the coupling of the auxiliary converter 840. Further, the auxiliary converter 840 is similar to the auxiliary converter 740 shown in FIG. 7. At least one difference however, is the addition of resistor R8 878 and capacitor C2 880. Similar to FIG. 7, the auxiliary converter 840 includes a resistor R7 778 instead of the energy transfer element L2 146 shown in FIGS. 1 and 2A. The collector terminal of the auxiliary power switch S3 244 is coupled to the resistor R7 778. The other end of resistor R7 778 is coupled to resistor R8 878 and capacitor C2 880. As shown, resistor R8 878 is then further coupled to diode D2 150 while capacitor C2 880 is coupled to output return 118. In operation, the timing circuit 142 outputs the auxiliary drive signal ADR 143 to turn on the auxiliary power switch S3 144 in response to the secondary drive signal SR 128. When the auxiliary power switch S3 144 is on, the output capacitor CO 115 is coupled to the resistor R7 778 and the bypass capacitor 133 may be pulse charged from the output voltage VOUT 116. Resistor R8 878 and capacitor C2 880 is configured to smooth out any current ripple to the bypass capacitor 133.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples: Example 1. An auxiliary converter coupled to an output of a main power converter comprising: an auxiliary switch coupled to the output of the main power converter; a timing circuit coupled to receive a control signal from a controller of the main power converter, wherein the controller regulates the output of the main power converter, the timing circuit configured to output an auxiliary drive signal to control switching of the auxiliary switch in response to the control signal; and an energy transfer element coupled to the auxiliary switch, wherein the energy transfer element is configured to transfer energy from the output of the main power converter to a supply of the controller, the supply provides operational power for the controller of the main power converter.

Example 2. The auxiliary converter of example 1, wherein the timing circuit is capacitively coupled to the controller to generate the auxiliary drive signal.

Example 3. The auxiliary converter of examples 1 or 2, wherein the timing circuit is directly coupled to the controller to generate the auxiliary drive signal.

Example 4. The auxiliary converter of any one of examples 1 to 3, wherein the auxiliary drive signal is level shifted to drive the auxiliary switch.

Example 5. The auxiliary converter of any one of examples 1 to 4, wherein the auxiliary drive signal is generated by a winding of an energy transfer element of the main power converter, the energy transfer element of the main power converter is configured to transfer energy from an input of the main power converter to the output of the main power converter.

Example 6. The auxiliary converter of any one of examples 1 to 5, wherein the controller of the main power converter is coupled to the input of the main power converter.

Example 7. The auxiliary converter of any one of examples 1 to 6, wherein the controller of the main power converter is coupled to the output of the main power converter.

Example 8. The auxiliary converter of any one of examples 1 to 7, wherein the auxiliary converter is an open loop converter operating at a frequency derived from an operating frequency of the main power converter.

Example 9. The auxiliary converter of any one of examples 1 to 8, wherein the auxiliary converter is a buck converter.

Example 10. The auxiliary converter of any one of examples 1 to 9, wherein the auxiliary switch comprises a bipolar junction transistor (BJT).

Example 11. The auxiliary converter of any one of examples 1 to 10, wherein the auxiliary switch comprises a metal-oxide-semiconductor field effect transistor (MOSFET).

Example 12. The auxiliary converter of any one of examples 1 to 11, wherein the energy transfer element of the auxiliary converter comprises an inductor.

Example 13. The auxiliary converter of any one of examples 1 to 14, wherein the energy transfer element of the auxiliary converter comprises a coupled inductor.

Example 14. The auxiliary converter of any one of examples 1 to 13, the timing circuit comprising: a capacitance coupled to the controller; and a first resistance coupled to the capacitance and a control terminal of the auxiliary switch, wherein a time constant of the capacitance and the first resistance determines an on-time of the auxiliary switch.

Example 15. The auxiliary converter of any one of examples 1 to 14, further comprising: a second resistance coupled to the control terminal of the auxiliary switch and the output of the main power converter, wherein a time constant of the capacitance, the first resistance, and the second resistance determines a reset time of the capacitance.

Example 16. The auxiliary converter of any one of examples 1 to 15, further comprising: a second auxiliary switch coupled to the capacitance and the first resistance; a third resistance coupled to the output of the main power converter and the second auxiliary switch; and a fourth resistance coupled to the second auxiliary switch, wherein the second auxiliary switch, third resistance, and fourth resistance are configured to vary a voltage between the capacitance and the first resistance in response to the output of the main power converter.

Example 17. The auxiliary converter of any one of examples 1 to 16, further comprising: a first diode coupled to the energy transfer element of the auxiliary converter to provide a path for a current of the energy transfer element when the auxiliary switch is off.

Example 18. The auxiliary converter of any one of examples 1 to 17, further comprising: a second diode coupled to the energy transfer element of the auxiliary converter and the supply of the controller, the second diode coupled to prevent current flow from the supply to the output of the main power converter.

Example 19. A main power converter, comprising: an energy transfer element coupled between an input of the main power converter and an output of the main power converter; a power switch coupled to the energy transfer element; a first controller coupled to the input of the main power converter, the first controller configured to generate a first drive signal to control switching of the power switch to transfer energy between the input and the output of the main power converter, the first controller configured to receive a request signal and to generate the first drive signal in response to a request event in the request signal; an output rectifier coupled to the energy transfer element; a second controller coupled to the output of the main power converter, the second controller configured to generate the request event in the request signal in response to the output of the main power converter, the second controller further configured to generate a second drive signal to control switching of the output rectifier; and an auxiliary converter coupled to the output of the main power converter and configured to generate a supply that provides operational power for the second controller, the supply generated in response to the second drive signal.

Example 20. The main power converter of example 19, the auxiliary converter comprising: an auxiliary switch coupled to the output of the main power converter; a timing circuit coupled to receive the second drive signal from the second controller, the timing circuit configured to output an auxiliary drive signal to control switching of the auxiliary switch in response to the second drive signal; and an energy transfer element coupled to the auxiliary switch, wherein the energy transfer element transfers energy from the output of the main power converter to the supply of the second controller.

Example 21. The main power converter of examples 19 or 20, wherein the auxiliary switch comprises a bipolar junction transistor (BJT).

Example 22. The main power converter of any one of examples 19 to 21, the timing circuit comprising: a capacitance coupled to the second controller to receive the second drive signal; and a first resistance coupled to the capacitance and a control terminal of the auxiliary switch, wherein a time constant of the capacitance and the first resistance determines an on-time of the auxiliary switch.

Example 23. The main power converter of any one of examples 19 to 22, the timing circuit further comprising: a second resistance coupled to the control terminal of the auxiliary switch and the output of the main power converter, wherein a time constant of the capacitance, the first resistance, and the second resistance determines a reset time of the capacitance.

Example 24. The main power converter of any one of examples 19 to 23, the auxiliary converter further comprising: a second diode coupled to the energy transfer element of the auxiliary converter and the supply of the second controller, the second diode configured to prevent current flow from the supply of the second controller to the output of the main power converter.

Example 25. An auxiliary converter coupled to a main power converter comprising: an auxiliary switch coupled to an input of the auxiliary converter, wherein the input of the auxiliary converter is coupled to receive a voltage generated by the main power converter; a timing circuit coupled to receive a control signal from a controller of the main power converter, wherein the controller regulates an output of the main power converter, the timing circuit configured to output an auxiliary drive signal to control switching of the auxiliary switch in response to the control signal; and an energy transfer element coupled to the auxiliary switch, wherein the energy transfer element is configured to transfer energy from the input of the auxiliary converter to an output of the auxiliary converter, the output of the auxiliary converter provides operational power for the controller of the main power converter.

Example 26. The auxiliary converter of example 25, wherein the input of the auxiliary converter is coupled to an output-side of the main power converter and is coupled to receive an output voltage generated by the main power converter.

Example 27. The auxiliary converter of examples 25 or 26 wherein the input of the auxiliary converter is coupled to an input-side of the main power converter and is coupled to receive an input-referenced voltage generated by the main power converter.

Example 28. The auxiliary converter of any one of examples 25 to 27, wherein the timing circuit is capacitively coupled to the controller to generate the auxiliary drive signal.

Example 29. The auxiliary converter of any one of examples 25 to 28, wherein the timing circuit is directly coupled to the controller to generate the auxiliary drive signal.

Example 30. The auxiliary converter of any one of examples 25 to 29, wherein the auxiliary drive signal is level shifted to drive the auxiliary switch.

Example 31. The auxiliary converter of any one of examples 25 to 30, wherein the auxiliary drive signal is generated by a winding of an energy transfer element of the main power converter, the energy transfer element of the main power converter is configured to transfer energy from an input of the main power converter to the output of the main power converter.

Example 32. The auxiliary converter of any one of examples 25 to 31, wherein the controller of the main power converter is coupled to the input of the main power converter.

Example 33. The auxiliary converter of any one of examples 25 to 32, wherein the controller of the main power converter is coupled to the output of the main power converter.

Example 34. The auxiliary converter of any one of examples 25 to 33, wherein the auxiliary converter is an open loop converter operating at a frequency derived from an operating frequency of the main power converter.

Example 35. The auxiliary converter of any one of examples 25 to 24, wherein the auxiliary converter is a buck converter.

Example 36. The auxiliary converter of any one of examples 25 to 35, wherein the auxiliary switch comprises a bipolar junction transistor (BJT).

Example 37. The auxiliary converter of any one of examples 25 to 36, wherein the auxiliary switch comprises a metal-oxide-semiconductor field effect transistor (MOSFET).

Example 38. The auxiliary converter of any one of examples 25 to 37, wherein the energy transfer element comprises an inductor.

Example 39. The auxiliary converter of any one of examples 25 to 38, wherein the energy transfer element r comprises a coupled inductor.

Example 40. The auxiliary converter of any one of examples 25 to 39, the timing circuit comprising: a capacitance coupled to the controller; and a first resistance coupled to the capacitance and a control terminal of the auxiliary switch, wherein a time constant of the capacitance and the first resistance determines an on-time of the auxiliary switch.

Example 41. The auxiliary converter of any one of examples 25 to 40, further comprising: a second resistance coupled to the control terminal of the auxiliary switch and the input of the auxiliary converter, wherein a time constant of the capacitance, the first resistance, and the second resistance determines a reset time of the capacitance.

Example 42. The auxiliary converter of any one of examples 25 to 41, further comprising: a second auxiliary switch coupled to the capacitance and the first resistance; a third resistance coupled to the input of the auxiliary converter and the second auxiliary switch; and a fourth resistance coupled to the second auxiliary switch, wherein the second auxiliary switch, third resistance, and fourth resistance are configured to reduce a voltage been the capacitance and the first resistance in response to the input of the auxiliary power converter.

Example 43. The auxiliary converter of any one of examples 25 to 42, further comprising: a first diode coupled to the energy transfer element of the auxiliary converter to provide a path for a current of the energy transfer element when the auxiliary switch is off.

Example 44. The auxiliary converter of any one of examples 25 to 43, further comprising: a second diode coupled to the energy transfer element of the auxiliary converter and the output of the auxiliary converter, the second diode coupled to prevent current flow from the output of the auxiliary converter to the input of the auxiliary converter.

Example 45. An auxiliary converter coupled to a main power converter comprising: an auxiliary switch coupled to an input of the auxiliary converter, wherein the input of the auxiliary converter is coupled to receive a voltage generated by the main power converter; a timing circuit coupled to receive a control signal from a controller of the main power converter, wherein the controller regulates an output of the main power converter, the timing circuit configured to output an auxiliary drive signal to control switching of the auxiliary switch in response to the control signal; and a first resistor coupled to the auxiliary switch, the first resistor configured to a provide current from the input of the auxiliary converter to an output of the auxiliary converter, wherein the output of the auxiliary converter provides operational power for the controller of the main power converter.

Example 46. The auxiliary converter of example 45, further comprising: a capacitor coupled to the first resistor; and a second resistor coupled to the first resistor, the capacitor and first resistor configured to smooth the current provided to the output of the auxiliary converter.

What is claimed is:
1. An auxiliary converter coupled to a regulated output of a main power converter comprising:
an auxiliary switch coupled to the regulated output of the main power converter;
a timing circuit coupled to receive a control signal from a controller of the main power converter, wherein the controller is configured to regulate the regulated output of the main power converter and the control signal is coupled to control the turn on and turn off of a switch of the main power converter, the timing circuit further configured to output an auxiliary drive signal to control switching of the auxiliary switch in response to the control signal, the timing circuit comprising:
- a capacitance coupled to the controller;
- a first resistance coupled to the capacitance and to a control terminal of the auxiliary switch, wherein a time constant of the capacitance and the first resistance determines an on-time of the auxiliary switch; and
- a second resistance coupled to the control terminal of the auxiliary switch and to the output of the main power converter, wherein a time constant of the capacitance, the first resistance, and the second resistance determines a reset time of the capacitance; and an energy transfer element coupled to the auxiliary switch, wherein the energy transfer element is coupled to transfer energy from the regulated output of the main power converter to a supply of the controller, and the supply is coupled to provide operational power for the controller of the main power converter.

2. The auxiliary converter of claim 1, wherein the timing circuit is capacitively coupled to the controller to generate the auxiliary drive signal.

3. The auxiliary converter of claim 1, wherein the auxiliary drive signal is level shifted to drive the auxiliary switch.

4. The auxiliary converter of claim 1, wherein the controller of the main power converter is coupled to an input of the main power converter.

5. The auxiliary converter of claim 1, wherein the controller of the main power converter is coupled to the output of the main power converter.

6. The auxiliary converter of claim 1, wherein the auxiliary converter is an open loop converter operating at a frequency derived from an operating frequency of the main power converter.

7. The auxiliary converter of claim 1, wherein the auxiliary converter is a buck converter.

8. The auxiliary converter of claim 1, wherein the auxiliary switch comprises a bipolar junction transistor (BJT).

9. The auxiliary converter of claim 1, wherein the auxiliary switch comprises a metal-oxide-semiconductor field effect transistor (MOSFET).

10. The auxiliary converter of claim 1, wherein the energy transfer element of the auxiliary converter comprises an inductor.

11. The auxiliary converter of claim 1, wherein the energy transfer element of the auxiliary converter comprises a coupled inductor.

12. The auxiliary converter of claim 1, further comprising:
- a second auxiliary switch coupled to the capacitance and to the first resistance;
- a third resistance coupled to the output of the main power converter and to the second auxiliary switch; and
- a fourth resistance coupled to the second auxiliary switch, wherein the second auxiliary switch, third resistance, and fourth resistance are configured to vary a voltage between the capacitance and the first resistance in response to the output of the main power converter.

13. The auxiliary converter of claim 1, further comprising:
- a first diode coupled to the energy transfer element of the auxiliary converter to provide a path for a current of the energy transfer element when the auxiliary switch is off.

14. The auxiliary converter of claim 1, further comprising:
- a second diode coupled to the energy transfer element of the auxiliary converter and to the supply of the controller, the second diode coupled to prevent current flow from the supply to the output of the main power converter.

15. A main power converter, comprising:
an energy transfer element coupled between an input of the main power converter and an output of the main power converter;
a power switch coupled to the energy transfer element;
a first controller coupled to a primary side of the main power converter, the first controller configured to generate a first drive signal to control switching of the power switch to transfer energy between the input and the output of the main power converter, the first controller further configured to receive a request signal and to generate the first drive signal in response to a request event in the request signal;
an output rectifier coupled to the energy transfer element;
a second controller coupled to a secondary side of the main power converter, the second controller configured to generate the request event in the request signal in response to the output of the main power converter, the second controller further configured to generate a second drive signal to control switching of the output rectifier; and
an auxiliary converter coupled to the output of the main power converter and configured to generate a supply that provides operational power for the second controller, the supply generated in response to the second drive signal, the auxiliary converter comprising:
an auxiliary switch coupled to the output of the main power converter; and
a timing circuit coupled to receive the second drive signal from the second controller, and configured to output an auxiliary drive signal to control switching of the auxiliary switch in response to the second drive signal, the timing circuit further comprising:
- a capacitance coupled to the second controller to receive the second drive signal; and
- a first resistance coupled to the capacitance and to a control terminal of the auxiliary switch, wherein a time constant of the capacitance and the first resistance determines an on-time of the auxiliary switch; and
- a second resistance coupled to the control terminal of the auxiliary switch and to the output of the main power converter, wherein a time constant of the capacitance, the first resistance, and the second resistance determines a reset time of the capacitance.

16. The main power converter of claim 15, the auxiliary converter further comprising:
an energy transfer element coupled to the auxiliary switch, wherein the energy transfer element transfers energy from the output of the main power converter to the supply of the second controller.

17. The main power converter of claim 16, wherein the auxiliary switch comprises a bipolar junction transistor (BJT).

18. The main power converter of claim 15, the auxiliary converter further comprising:
a second diode coupled to the energy transfer element of the auxiliary converter and to the supply of the second controller, the second diode configured to prevent current flow from the supply of the second controller to the output of the main power converter.

19. An auxiliary converter coupled to a main power converter comprising:
an auxiliary switch coupled to an input of the auxiliary converter, wherein the input of the auxiliary converter is coupled to receive a voltage generated by the main power converter;
a timing circuit coupled to receive a control signal from a controller of the main power converter, wherein the controller is configured to regulate an output of the main power converter and the control signal is coupled to control the turn on and turn off of a switch of the main power converter, the timing circuit configured to output an auxiliary drive signal to control switching of the auxiliary switch in response to the control signal, the timing circuit comprising:
a capacitance coupled to the controller;
a first resistance coupled to the capacitance and to a control terminal of the auxiliary switch, wherein a time constant of the capacitance and the first resistance determines an on-time of the auxiliary switch; and
a second resistance coupled to the control terminal of the auxiliary switch and to the input of the auxiliary converter, wherein a time constant of the capacitance, the first resistance, and the second resistance determines a reset time of the capacitance; and
an energy transfer element coupled to the auxiliary switch to transfer energy from the input of the auxiliary converter to an output of the auxiliary converter, wherein the output of the auxiliary converter is coupled to provide operational power for the controller of the main power converter.

20. The auxiliary converter of claim 19, wherein the input of the auxiliary converter is coupled to an output-side of the main power converter to receive an output voltage generated by the main power converter.

21. The auxiliary converter of claim 19, wherein the input of the auxiliary converter is coupled to an input-side of the main power converter to receive an input-referenced voltage generated by the main power converter.

22. The auxiliary converter of claim 19, wherein the timing circuit is capacitively coupled to the controller to generate the auxiliary drive signal.

23. The auxiliary converter of claim 19, wherein the timing circuit is directly coupled to the controller to generate the auxiliary drive signal.

24. The auxiliary converter of claim 19, wherein the auxiliary drive signal is level shifted to drive the auxiliary switch.

25. The auxiliary converter of claim 19, wherein the controller of the main power converter is coupled to the input of the main power converter.

26. The auxiliary converter of claim 19, wherein the controller of the main power converter is coupled to the output of the main power converter.

27. The auxiliary converter of claim 19, wherein the auxiliary converter is an open loop converter operating at a frequency derived from an operating frequency of the main power converter.

28. The auxiliary converter of claim 19, wherein the auxiliary converter is a buck converter.

29. The auxiliary converter of claim 19, wherein the auxiliary switch comprises a bipolar junction transistor (BJT).

30. The auxiliary converter of claim 19, wherein the auxiliary switch comprises a metal-oxide-semiconductor field effect transistor (MOSFET).

31. The auxiliary converter of claim 19, wherein the energy transfer element comprises an inductor.

32. The auxiliary converter of claim 19, wherein the energy transfer element comprises a coupled inductor.

33. The auxiliary converter of claim 19, further comprising:
a second auxiliary switch coupled to the capacitance and to the first resistance;
a third resistance coupled to the input of the auxiliary converter and to the second auxiliary switch; and
a fourth resistance coupled to the second auxiliary switch, wherein the second auxiliary switch, third resistance, and fourth resistance are configured to vary a voltage between the capacitance and the first resistance in response to the input of the auxiliary converter.

34. The auxiliary converter of claim 19, further comprising:
a first diode coupled to the energy transfer element of the auxiliary converter to provide a path for a current of the energy transfer element when the auxiliary switch is off.

35. The auxiliary converter of claim 19, further comprising:
a second diode coupled to the energy transfer element of the auxiliary converter and to the output of the auxiliary converter, the second diode coupled to prevent current flow from the output of the auxiliary converter to the input of the auxiliary converter.

36. An auxiliary converter coupled to a main power converter comprising:
an auxiliary switch coupled to an input of the auxiliary converter, wherein the input of the auxiliary converter is coupled to receive a regulated voltage generated by the main power converter;
a timing circuit coupled to receive a control signal from a controller of the main power converter, wherein the controller-is configured to regulate the regulated voltage of the main power converter and wherein the control signal is coupled to control the turn on and turn off of a switch of the main power converter, the timing circuit configured to output an auxiliary drive signal to control switching of the auxiliary switch in response to the control signal the timing circuit comprising:
a capacitance coupled to the controller;
a first resistance coupled to the capacitance and to a control terminal of the auxiliary switch, wherein a time constant of the capacitance and the first resistance determines an on-time of the auxiliary switch; and
a second resistance coupled to the control terminal of the auxiliary switch and to the input of the auxiliary converter, wherein a time constant of the capacitance, the first resistance, and the second resistance determines a reset time of the capacitance; and
a third resistance coupled to the auxiliary switch, the third resistance is configured to provide a current from the input of the auxiliary converter to an output of the auxiliary converter, wherein the output of the auxiliary converter provides operational power for the controller of the main power converter.

37. The auxiliary converter of claim 36, further comprising:
a second capacitance coupled to the third resistance; and
a fourth resistance coupled to the third resistance, the second capacitance and third resistance are configured to smooth the current provided to the output of the auxiliary converter.

38. An auxiliary converter coupled to a regulated output of a main power converter comprising:
- an auxiliary switch coupled to the regulated output of the main power converter;
- a timing circuit coupled to receive a control signal, the timing circuit configured to output an auxiliary drive signal to control switching of the auxiliary switch in response to the control signal, the timing circuit comprising:
- a capacitance coupled to the controller;
- a first resistance coupled to the capacitance and to a control terminal of the auxiliary switch, wherein a time constant of the capacitance and the first resistance determines an on-time of the auxiliary switch; and
- a second resistance coupled to the control terminal of the auxiliary switch and to the regulated output of the main power converter, wherein a time constant of the capacitance, the first resistance, and the second resistance determines a reset time of the capacitance;
- an energy transfer element coupled to the auxiliary switch, wherein the energy transfer element is coupled to transfer energy from the regulated output of the main power converter to a supply of the controller, and the supply is coupled to provide operational power for the controller of the main power converter.

39. The auxiliary converter of claim 38, wherein the control signal controls the turn on and turn off of a switch of the main power converter.

40. The auxiliary converter of claim 38, wherein the control signal is a switching edge waveform generated by a winding of an energy transfer element of the main power converter, the energy transfer element of the main power converter is coupled to transfer energy from an input of the main power converter to the regulated output of the main power converter.

41. The auxiliary converter of claim 38, further comprising:
- a first diode coupled to the energy transfer element of the auxiliary converter to provide a path for a current of the energy transfer element when the auxiliary switch is off; and
- a second diode coupled to the energy transfer element of the auxiliary converter and to the supply of the controller, the second diode coupled to prevent current flow from the supply to the output of the main power converter.

42. The auxiliary converter of claim 38, wherein the auxiliary switch comprises a bipolar junction transistor (BJT).

43. The auxiliary converter of claim 38, wherein the auxiliary switch comprises a metal-oxide-semiconductor field effect transistor (MOSFET).

44. The auxiliary converter of claim 38, wherein the energy transfer element of the auxiliary converter comprises an inductor.

45. The auxiliary converter of claim 38, wherein the energy transfer element of the auxiliary converter comprises a coupled inductor.

46. The auxiliary converter of claim 38, further comprising:
- a second auxiliary switch coupled to the capacitance and to the first resistance;
- a third resistance coupled to the output of the main power converter and to the second auxiliary switch; and
- a fourth resistance coupled to the second auxiliary switch, wherein the second auxiliary switch, third resistance, and fourth resistance are configured to vary a voltage between the capacitance and the first resistance in response to the output of the main power converter.

* * * * *